United States Patent [19]

Hill et al.

[11] Patent Number: 4,727,672

[45] Date of Patent: Mar. 1, 1988

[54] ARTIFICIAL STRUCTURE FOR ATTRACTING FISH

[75] Inventors: Loren G. Hill, 2826 Castlewood, Norman, Okla. 73069; William H. Wilson, Fort Smith, Ark.; James J. Thompson, Lithonia, Ga.; J. Douglas Alsup, Conyers, Ga.; James B. Watson, Lithonia, Ga.

[73] Assignee: Loren G. Hill, Norman, Okla.

[21] Appl. No.: 883,326

[22] Filed: Jul. 8, 1986

[51] Int. Cl.$^4$ .......................... A01N 3/00; A41G 1/00
[52] U.S. Cl. ........................................... 43/4; 428/17; 428/20
[58] Field of Search .................... 43/4; 405/21-24, 405/26, 28; 428/17, 18, 19, 20; 119/3

[56] References Cited

U.S. PATENT DOCUMENTS

| | | | |
|---|---|---|---|
| 878,271 | 2/1908 | Blackford | 428/18 X |
| 1,478,728 | 12/1923 | Brown . | |
| 2,186,351 | 1/1940 | Stojaneck . | |
| 2,826,846 | 3/1958 | Warren . | |
| 3,144,375 | 8/1964 | Day | 428/19 X |
| 3,214,318 | 10/1965 | Snow | 428/18 X |
| 3,573,143 | 3/1971 | Baus . | |
| 3,682,753 | 8/1972 | Willinger . | |
| 4,130,994 | 12/1978 | Van Moss, Jr. | 405/24 |
| 4,185,743 | 1/1980 | Willinger | 428/17 X |

FOREIGN PATENT DOCUMENTS

| | | | |
|---|---|---|---|
| 1237672 | 6/1960 | France | 428/20 |
| 316286 | 4/1934 | Italy | 428/20 |

Primary Examiner—Gene P. Crosby
Assistant Examiner—Carmine Cuda
Attorney, Agent, or Firm—Laney, Dougherty, Hessin & Beavers

[57] ABSTRACT

An artificial structure for attracting fish, which structure includes a ballast and anchoring subassembly having an elongated trunk detachably and pivotally connected thereto and extending in a generally vertical direction therefrom. A plurality of elongated leaf fronds are each centrally engaged with the trunk at longitudinally spaced intervals along the trunk.

29 Claims, 12 Drawing Figures

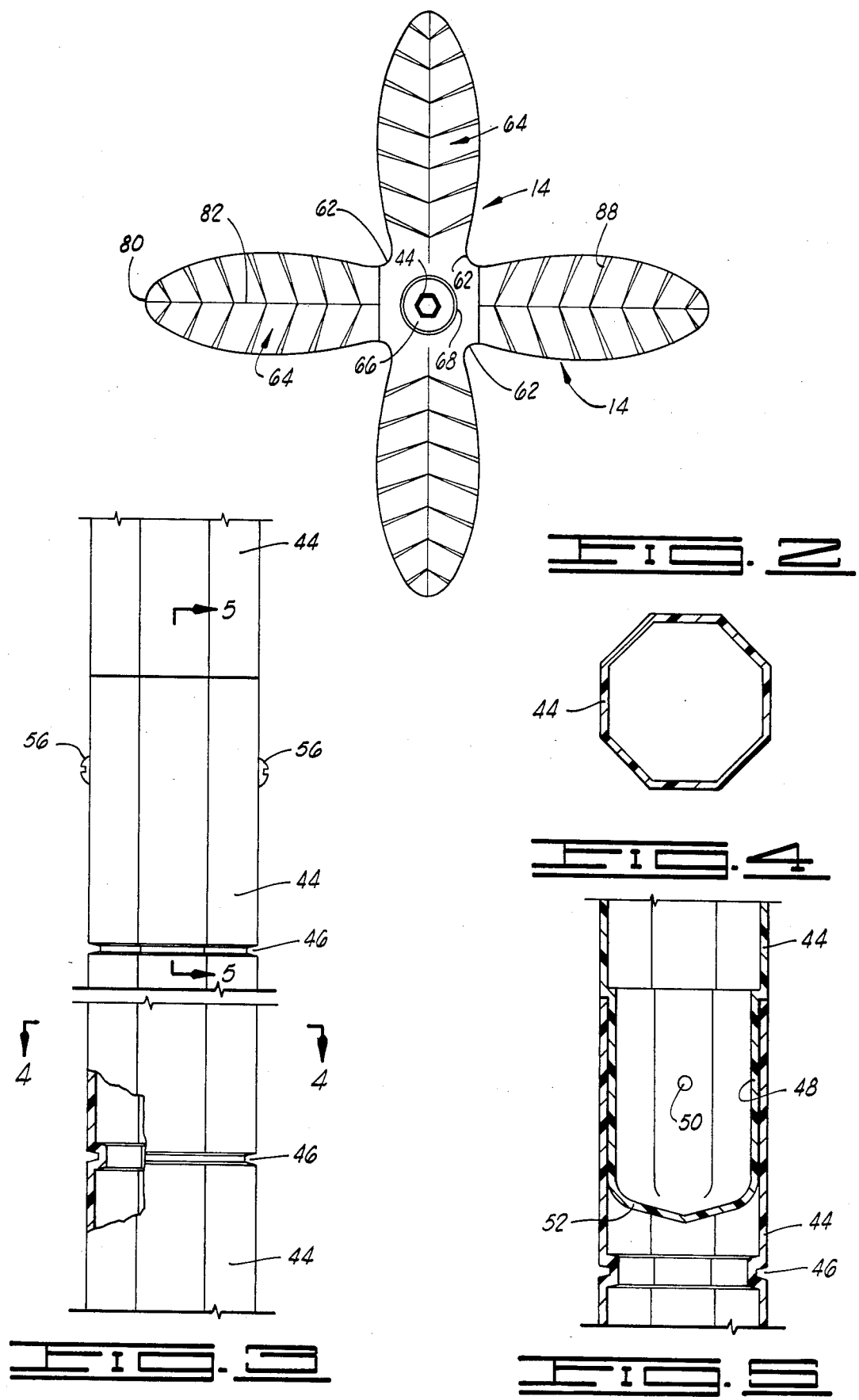

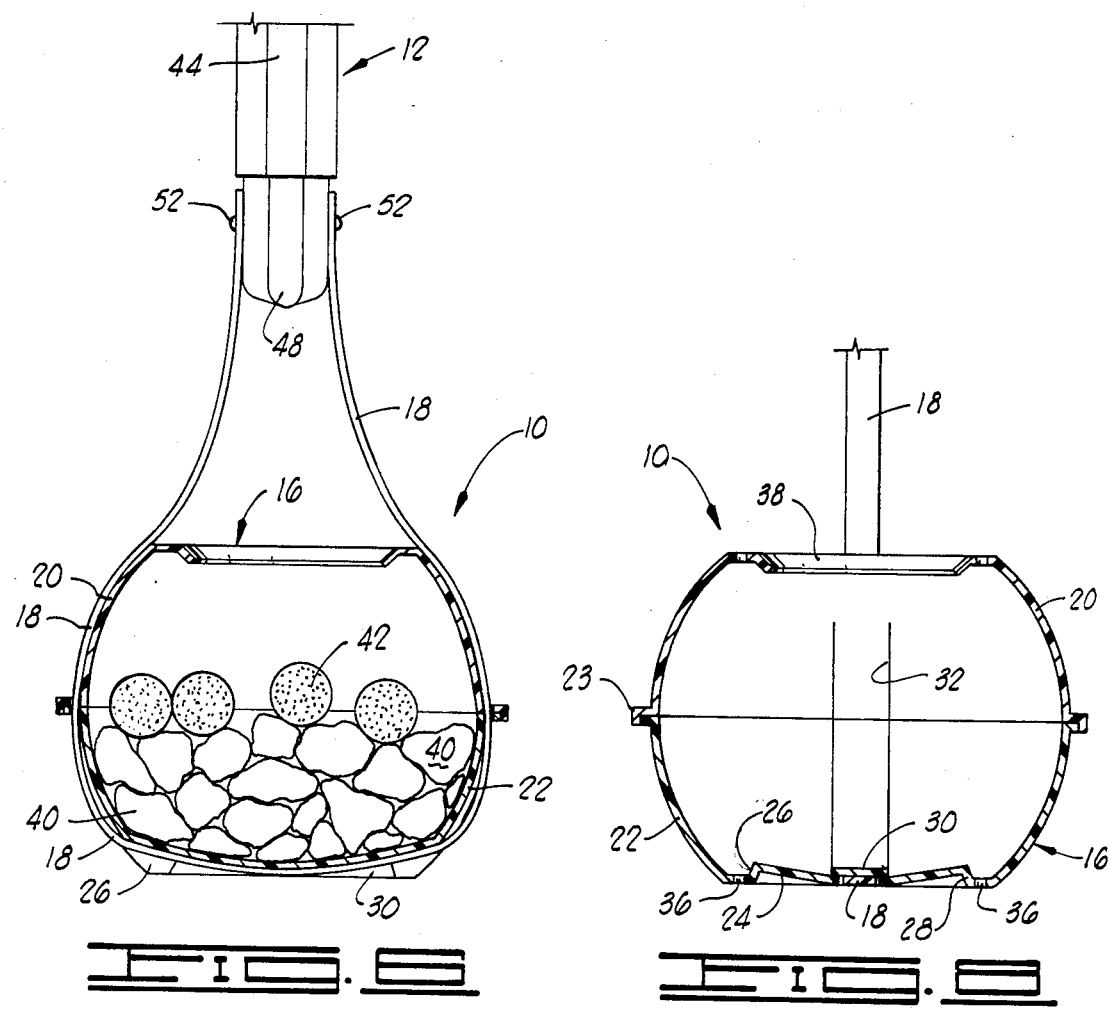

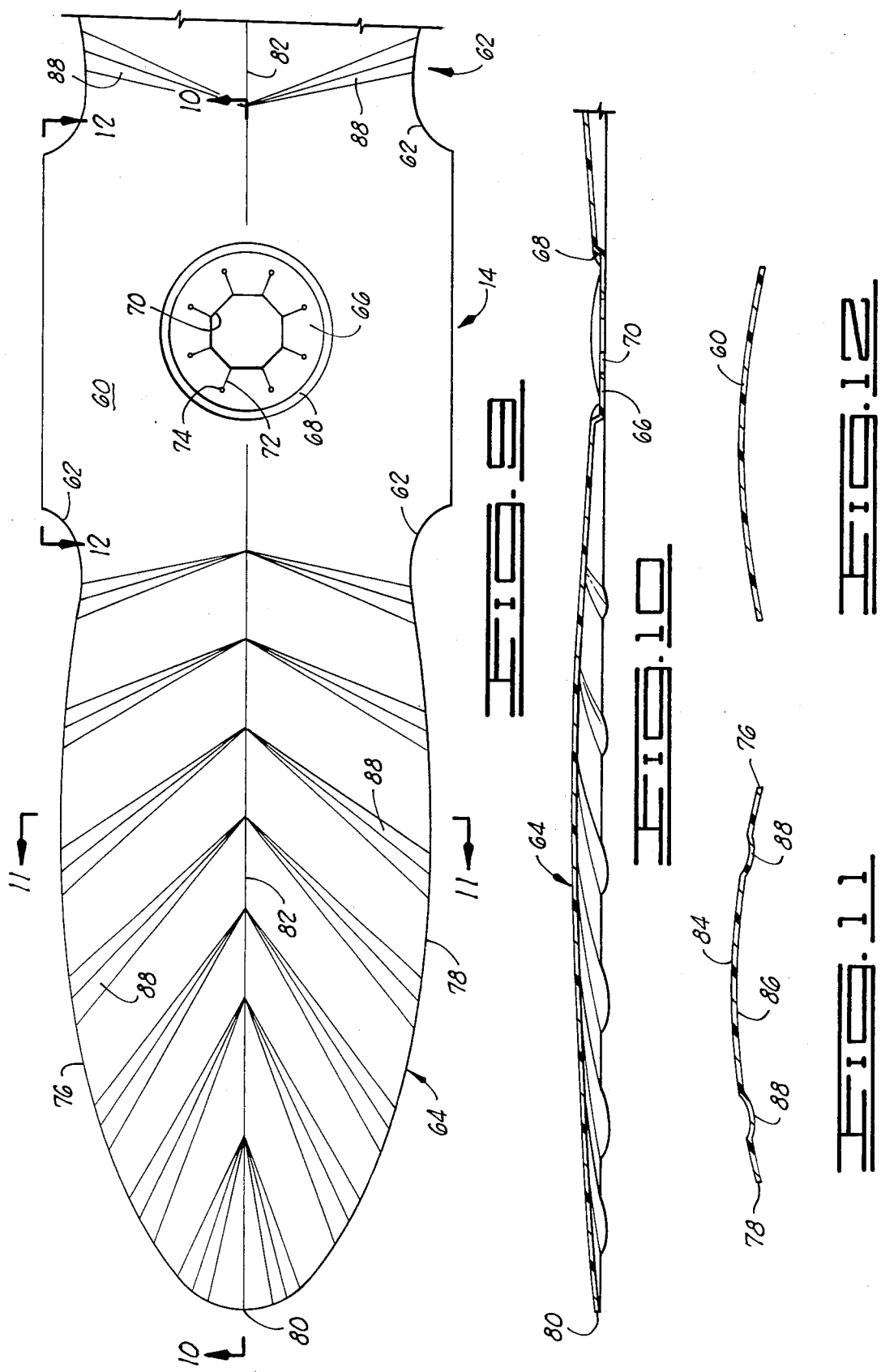

ARTIFICIAL STRUCTURE FOR ATTRACTING FISH

FIELD OF THE INVENTION

This invention relates to artificial plants adapted for submersion in fresh water bodies, which structures are simulative of naturally occurring flora, but which have an extended service life, and are preferably constructed of a synthetic resin plastic material. The artificial structure is configured to be attractive to fish, and thus to create an artificial habitat around which fish can usually be found.

BRIEF DESCRIPTION OF THE PRIOR ART

Various types of artificial plants have been devised for a variety of purposes, including interior decoration by simulation of interior house plants, artificial Christmas trees and various other structures which simulate, for varying reasons, many types of naturally occurring plants. With the evolution and development of new types of synthetic resins having widely differing properties, and being susceptible to the incorporation therein of pigmentation affording a wide range of color development and selection, the extent to which a wide variety of plants can be closely simulated has been greatly increased.

One type of artificial structure which has been heretofore proposed is a low density polyethylene structure which resembles a water plant, and which can be quickly assembled and placed in an aquarium to create a desirable environment for fish. This structure is described in Willinger U.S. Pat. No. 3,682,753.

Examples of patents which have been granted on synthetic resin structures intended to resemble trees and shrubs include Brown U.S. Pat. No. 1,478,728, Doran U.S. Pat. No. 2,214,046, Warren U.S. Pat. Nos. 2,826,845 and 2,826,846, Keidd U.S. Pat. No. 3,011,280, Barrs et al U.S. Pat. Nos. 3,459,624 and 3,463,696, Hermanson U.S. Pat. No. 3,829,349, Baus U.S. Pat. Nos. 3,573,143 and 3,616,102, Kent U.S. Pat. No. 3,499,818 and Howard U.S. Pat. No. 1,933,495.

BRIEF DESCRIPTION OF THE PRESENT INVENTION

The present invention provides an artificial structure which resembles a small tree or shrub having a vertically extending trunk with a plurality of limbs or leaves radiating outwardly from the axis of the trunk at longitudinally spaced intervals therealong. The artificial structure is particularly designed and constructed so that it is attractive to fish, both because of the colors employed, and because of the arrangement of the artificial leaf fronds (forming a part of the structure) in their relationship to each other, and in their spacing along the trunk. An anchoring and ballast assembly is provided which is pivotally attached to one end of the elongated trunk, so that the trunk can be quickly detached if it is desired to move the entire structure from one location to the other, or to store it. In being pivotally connected to the anchoring and ballast assembly, the trunk and the leaves carried thereon can swivel or pivot as a result of water motion, or to accommodate the anchoring assembly to an uneven bottom without altering the verticality of the trunk which extends upwardly from the bottom.

A plurality of elongated leaf fronds are each connected or engaged with the trunk. The fronds are disposed at longitudinally spaced intervals along the trunk, and also at circumferentially spaced intervals with respect to each other, so as to provide the optimum arrangement, when considered in collective array, for causing fish to congregate adjacent the structure. Each of the leaf fronds is both longitudinally and transversely bowed, so as to impart to the fronds maximum structural strength, while retaining substantial natural simulation. Each frond includes a plurality of ribs or veins which extend generally transversely outwardly from a longitudinal centerline extending down the center of the frond and radiating from the trunk outwardly.

An important object of the invention is to provide an artificial structure which, by reason of its buoyancy in water, will maintain itself in a certain attitude when it is placed in a submerged position in the water, and retained there by a ballasting or anchoring assembly forming a part of the structure.

Another object of the invention is to provide an artificial structure for attracting fish which is geometrically configured so as to provide a protective or sheltering environment for the fish without being so compact and dense that the fish cannot easily enter between artificial leaf fronds forming a part of the structure.

An additional object of the invention is to provide an artificial structure for attracting fish, which structure is constructed so that it obviates fowling or impalement thereupon of hooks utilized by fisherman for the purpose of fishing for piscatorial species which may be located in close proximity to the structure.

A further object of the invention is to provide an artificial structure for attracting fish, which structure can be operably fixed at a desired location on even a steeply sloping bottom within a fresh water body.

A further object of the invention is to provide an artificial structure for attracting fish which has leaf fronds forming a part thereof, and so configured that the fronds have good mechanical strength, and also closely simulate the natural fronds found on several naturally occurring plants.

Additional objects and advantages of the invention will become apparent as the following detailed description of the invention is read in conjunction with the accompanying drawings which illustrate a preferred emobdiment of the invention.

GENERAL DESCRIPTION OF THE DRAWINGS

FIG. 2 is a sectional view taken along line 2—2 of FIG. 1.

FIG. 3 is an enlarged fragmentary elevational view of a portion of the elongated trunk which is a part of the artificial structure of the invention. A portion of the trunk is broken away in order to illustrate structural detail.

FIG. 4 is a sectional view taken along line 4—4 of FIG. 3.

FIG. 5 is a sectional view taken along line 5—5 of FIG. 3.

FIG. 6 is a view partially in side elevation and partially in section depicting the manner in which a ballast assembly, shown in section, is pivotally connected to the lower end of one trunk section of an an elongated trunk assembly forming a part of the artificial structure of the invention.

FIG. 7 is a sectional view taken along line 7—7 of FIG. 1, and providing a top plan view of the ballast container forming a part of the ballast assembly.

FIG. 8 is a sectional view taken along line 8—8 of FIG. 7.

FIG. 9 is a top plan view of approximately one-half of one of the leaf fronds forming a part of the artificial structure of the invention.

FIG. 10 is a sectional view taken along line 10—10 of FIG. 9.

FIG. 11 is a sectional view taken along line 11—11 of FIG. 9.

FIG. 12 is a sectional view taken along line 12—12 of FIG. 9.

DETAILED DESCRIPTION OF A PREFERRED EMBODIMENT OF THE INVENTION

Figure 1:
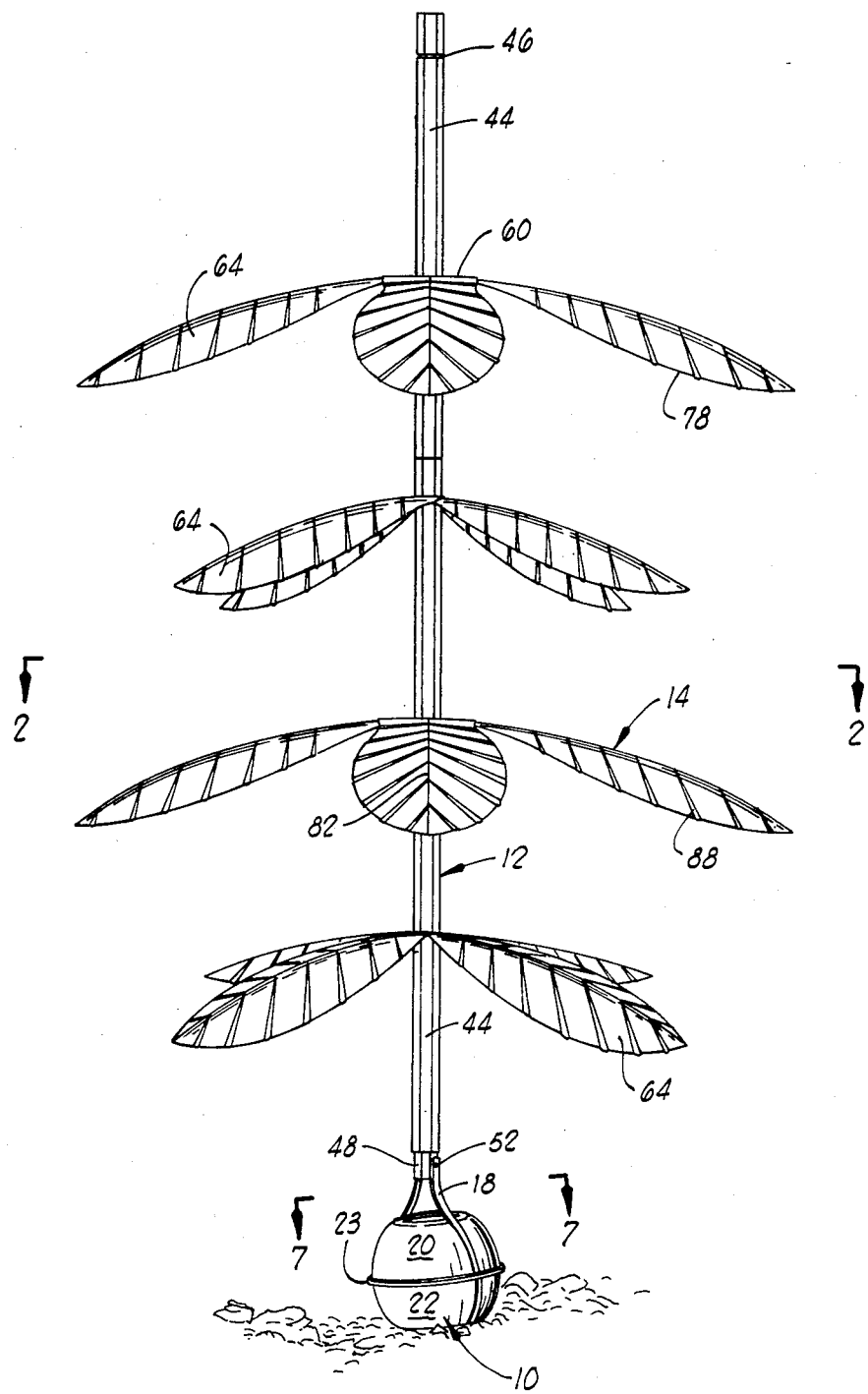
FIG. 1 is a view in elevation of an artificial structure for attracting fish, which structure is constructed in accordance with the present invention, and illustrating one form of such structure.

Referring initially to FIG. 1 of the drawings, the artificial fish attracting structure of the invention is comprised of three major assemblies. These include a ballast assembly, designated generally by reference numeral 10, a trunk assembly designated generally by reference numeral 12 and a plurality of leaf frond assemblies, each designated by reference numeral 14. The ballast assembly 10 is used for anchoring and supporting the artificial structure at a desired location on the bottom of a body of fresh water for purposes of attracting fish. The ballast assembly 10 is pivotally connected in a manner hereinafter described to a lowermost section of the elongated trunk assembly 12.

The trunk assembly 12 is constructed of a buoyant, synthetic resin material which causes the trunk subassembly to extend generally vertically in the water from the ballast assembly 10. A preferred material of construction of the trunk assembly is polypropylene. The trunk assembly 12 functions to support, at selected locations therealong, a plurality of the leaf frond assemblies 14. The leaf frond assemblies 14 are detachably engaged with the trunk assembly 12 at predetermined locations, and in predetermined angular positions to impart to the artificial structure, geometric characteristics which enhance its fish attracting capability. Like the trunk assembly 12 the leaf assemblies 14 are constructed of a buoyant synthetic resin material. The leaf assemblies 12 are preferably constructed of high density polyethylene.

Referring initially in detail to the construction of the ballast assembly 10, such details of construction are best illustrated in FIGS. 1, 6, 7 and 8 of the drawings. The ballast assembly 10 includes an anchoring base container, designated generally by reference numeral 16, and an elongated flexible securing strap 18.

The anchoring base containing 16 includes a generally spherically-shaped wall portion which can be formed, as shown in the illustrated embodiment, as an upper wall portion 20 and a lower portion 22. The upper and lower wall portions 20 and 22 are joined to each other around an equatorial line of joinder 23 by solvent welding, glueing or other suitable means, so that the two wall portions together form a generally spherically-shaped container having a hollow interior. The hollow base container 16 thus formed also has a base wall 24 which extends across the bottom of the container. The base wall 24 is molded of a synthetic plastic so as to define a pair of substantially semi-circular supporting feet 26 and 28 at opposite sides thereof, and a transverse strap-receiving channel 30. The channel 30 extends across the center of the base 24 and functions to receive a central bight portion of the securing strap 18, as best shown in FIGS. 7 and 8. The wall portions 20 and 22 are also molded so as to define an indented channel 32 which extends along opposite sides of the container for accommodating the strap 18. The channel 32 is formed to permit the opposite legs of the securing strap 18 to be passed through slots formed radially inwardly of the equatorial line of joinder of the upper wall portion 20 to the lower wall portion 22, as best shown in FIG. 6.

A plurality of small circular openings 36 are formed through the bottom wall 24 of the container 16 in a circular array around the outer portion of the bottom wall at the location where the legs 26 and 28 are positioned. The apertures or openings 36 permit water to be drained through the bottom wall, rather than retained within the container.

At its upperside, the container 16 has a central opening which opens downwardly thereinto, and this opening is defined by a surrounding downwardly and inwardly turned flange 38. The flange 38 is provided with a plurality of circular apertures 39 arranged in a generally circular array. The annular flange 38 functions both to direct ballast material into the interior of the container, during loading, and also functions as a means by which the container can be picked up and moved from one location to the other for purposes hereinafter described.

At the free upper ends thereof, the two legs of the securing strap 18 carry a pair of apertures which facilitate the pivotal connection of the ballast assembly 10 to the trunk assembly 12 as hereinafter explained.

As the aritificial fish attracting structure of the invention is normally utilized, ballast material 40 is placed in the bottom of the container formed by the joined wall portions 20 and 22. The ballast material 40 may be stones, lead shot or other suitable material. Lead is not favored, however, since it tends to release deleterious free lead and lead compounds into the water in which the device is used. Small rocks or any other relatively dense material, which can function for anchoring or retaining the container against the bottom of the body of water in which the structure is to be located, will be satisfactory.

FIG. 6 of the drawings shows that there can also be located within the container 16 forming a part of the ballast assembly 10, a plurality of dough balls 42 or other bait material which, upon being softened by the water, will be released to float upwardly out of the opening in the top of the container, or will be activated for releasing a scent into the water after the device has been placed in its selected location, and the bait material 42 has been contacted by the water.

As pointed out above, the ballast assembly 10 is connected to the trunk assembly 12 by the pivotal engagement of the upper end portions of the securing strap 18 with the lower end of the trunk assembly. The trunk assembly 12 includes a pre-selected number of elongated tubular trunk sections 44 which are telescopingly engaged in the manner best illustrated in FIGS. 1, 3, 5 and 6. Each of these sections 44 has a hollow interior, as best shown in FIGS. 3 and 5, and each is generally octagonally configured in cross-section, as depicted in FIG. 4 in the drawings. At longitudinally spaced intervals along each of the sections 44, each section defines an indentation or groove 46 which projects radially inwardly into the section from the outer periphery thereof, and lies in a plane which extends normal to the longitudinal axis of the respective trunk section.

To facilitate the joinder of the trunk sections 44, each section carries a male protuberant portion 48 of reduced transverse thickness at one end of the respective section, as illustrated in FIGS. 1, 5 and 6. The protuberant portion 48 has a pair of apertures 50 formed on opposite sides thereof as shown in FIG. 5, and where the protuberant portion 48 is that which is carried on the lowermost one of the sections 44, such as is illustrated in FIGS. 1 and 6, the apertures 50 may be employed, in cooperation and co-action with suitably configured pins 52, to facilitate the pivotal securement of the ends of the strap 18 to the downwardly projecting protuberant portion.

In addition to functioning as a locus at which the trunk assembly 12 can be connected to the ballast assembly 10 by means of the strap 18, the protuberant portion 48 can also be used for telescoping engagement with an open upper end of each of the tubular sections 44 of the trunk assembly 12. This telescoping engagement is depicted in FIGS. 3 and 5. Each two sections 44 which are telescopingly engaged have a mating outer peripheral surface when in engagement, and they are locked in telescoping engagement by means of screws 56, or other suitable fastening means, extended through openings or apertures (not visible) in the outer tubular section 44, which openings are in alignment with the apertures 50 formed in the protuberant portion 48 as shown in FIG. 5.

It will be apparent, of course, that by reason of the octagonal cross-sectional configuration of the tubular sections 44, these sections cannot turn or rotate relative to each, but are interlocked in a fixed relationship. It will also be apparent that as many of the tubular trunk sections 44 as may be desired can be telescopingly engaged with each other to extend the trunk assembly 12 over any vertical distance desired.

It will be noted in referring to FIG. 5 that the terminal portion of each protuberant end portion 48 is closed by a transversely extending closure plate 52. It will thus be perceived that it is possible to place into each of the hollow tubular trunk sections 44 of the trunk assembly, a light, a substance which will develop a fish attracting odor, additional ballast material (though this is rarely desirable), or other things or materials aiding the overall function of the fishing attracting structure of the invention.

The leaf frond assemblies 14 forming a part of the artificial structure of the invention are best illustrated in FIG. 2 and FIGS. 9–12. Each leaf frond assembly 14 includes a central trunk engaging section 60 which is generally rectangular in configuration, and defines an arcuate notch 62 at each of its corners. Each notch 62 is formed on a relatively large radius. Projecting from opposite sides of the central section 58, and in opposed alignment with each other, are a pair of elongated leaf elements, each referred to generally by reference numeral 64. As shown in FIG. 12, the central trunk engaging section 60 of the leaf frond assembly 14 is arcuate in configuration so that the convex side of this section faces upwardly, and the concave side faces downwardly.

Located at the center of the central trunk engaging section 60 is a depressed or offset, generally circular area 66 where the synthetic resin has been stamped or molded in a configuration in which this area is located downwardly from, and offset out of the plane of, the remainder of the central section 60. There is thus developed, an annular angulation or shoulder 68 surrounding this area which imparts substantial mechanical strength to this portion of the leaf frond assembly 14, and enables it to more tenaciously and firmly engage the trunk assembly in a manner hereinafter described.

The circular area 66 defines, at the center thereof, an octagonally-shaped opening 70. The octagonally-shaped opening 70 is of slightly lesser areal size than the cross-sectional area of the trunk sections 44. The opening 70 is bounded by eight contiguous side portions which define angles at the intersection of each adjacent pair of side portions. From these corners where two adjacent side portions intersect, the circular area 66 is split or slotted, and therefore is divided into a plurality of segments disposed between the radiating outwardly extending slots 72. Each of the slots 72 terminates at its radially outer end in a small circular opening or aperture 74 through the synthetic resin. This functions to prevent the slot 72 from tearing or ripping out further in a radial direction.

Each of the elongated leaf elements 64 disposed on opposite sides of the central trunk engaging section 60 is formed as a substantial portion of an elipse. Each of the leaf elements 64 thus has a pair of convex outer edges 76 and 78 which converge at the outer end of the leaf in a rounded end or terminus 80. The end 80 is located at the end of a centrally extending line of division or axis 82 which extends to the central engaging section 60. The line 82 bisects the respective leaf element 64. As shown in FIGS. 10 and 11, each of the leaf elements 64 is symetrically curved in a transverse direction across the axis line 82 so that the leaf element has a convex upper side 84 and a concave lower side 86 as shown in FIG. 11. Extending laterally and outwardly along each leaf element are a plurality of depressed ribs or vein elements 88 which simulate the veins or ribs of a natural leaf. As will be perceived by references to FIGS. 9, 10 and 11, each of these ribs or veins 88 is of increasing transverse width from the line 82 outwardly to the peripheral edge 76 of the respective leaf element 64.

The arched cross-sectional configuration of each leaf element 64 imparts mechanical strength and rigidity to the leaf element, and assists the leaf element in extending outwardly from the central trunk engaging section 60 without drooping or falling downwardly in the water. This outwardly extending orientation is further aided by the construction of each of the leaf elements from a high density closed cell polyethylene construction which is used in the construction of each of the leaf frond assemblies 14 and imparts substantial buoyancy thereto. The specific gravity of the synthetic resin construction of the leaf frond assemblies 14 is preferably between about 0.9 and 0.98 with the most preferred specific gravity being between 0.92 and 0.96.

It is further pointed out that the upper and lower surfaces of each of the leaf elements 64, as well as the upper and lower surface of each central trunk engaging section 60 is roughened or textured. Texturing the surfaces of the leaf elements in this fashion enables the affixation to, or growth upon, these surfaces of periphyton (plant and animal micro-organisms), and such growth has been particularly conducive to the congregation of fish in the vicinity of the structure.

In the construction of the leaves, they are preferably thermoformed in the configuration described, and are pigmented at certain locations thereupon to provide certain colors which are particularly visible and attractive to fish at selected locations on the leaves.

OPERATION

In the utilization and operation of the artificial structure of the invention, the location where the structure is to be submerged in a body of fresh water is initially determined. The fresh water body will, of course, be a lake, stream or impoundment in which fish live, and the purpose of locating the artificial structure therein may be for attracting fish in order to enhance the fishing success in a particular area, or it may be to attract fish to a particular locale for the purpose of enhanced nutrition or for piscatoral study, such as in a fish raising facility, and in an aquatic biological study station.

In any event, when the location where it is desired to place the artificial structure has been determined, the structure is variously assembled according to factors such as other surrounding submerged trees, brush and the like, the steepness of the bank and the depth and clarity of the water. In the illustrated embodiment of the invention, an artificial structure which will extend from the bottom upwardly to a height of 7 or 8 feet is illustrated.

In assembling the structure to afford the most effective fish attracting device in the particular area selected, it is perhaps easiest to initially place a plurality of the leaf frond assemblies 14 on each of the tubular trunk sections 44 which will be used in assembling the structure. (As an alternative procedure, the trunk sections may first be telescopingly engaged in end-to-end relation before the leaf frond assemblies are secured thereto.) Where two of such tubular trunk sections 44 are to be utilized, as illustrated in the drawings for illustrative purposes, the trunk sections are engaged by a plurality of the leaf frond assemblies which are selectively oriented relative to each other, and in longitudinally spaced relationship along the trunk sections, as shown in FIG. 1 of the drawings.

To locate one of the leaf frond assemblies 14 on a trunk section 44, the leaf frond assembly is pushed down over one end of the trunk section so that the trunk section passes through the octagonally-shaped opening 70 disposed in the center of the area 66. The stiffness of the synthetic resin material is such that relatively tenacious frictional engagement is established between the flaps formed between the slots 72 in the area 66 and the external periphery of the trunk section 44. In fact, these flaps must flex upwardly sufficiently to allow the trunk section 44 to pass by until a point is reached where these flaps between the slots 72 can pivot inwardly sufficiently to have the inner ends of the flaps extending into engagement with the peripheral slot or recess 46.

After one of the frond assemblies 14 has been engaged with a recess or indentation 46 in the manner described, a second frond assembly 14 is pressed over the free end of the respective tubular trunk section 44, and is forced axially along the trunk section until the flaps defined between the slots 72 adjacent the hexagonal opening 70 through the frond assembly can also enter the indentation 46. The second frond assembly 14 is thus also locked in position against axial movement, and has its center section 60 overlying the center section 60 of the first frond assembly 14 which is already in place on the trunk section 44 and engaged with the indentation 46. The two fronds assemblies 14 as thus arranged and in engagement with the indentation 46 can then be pivoted or swiveled about the longitudinal axis of the tubular trunk section 44 until a desired orientation of the two frond assemblies in relation to each other has been obtained.

A preferred form of such orientation, in which the two frond assemblies 14 extended at right angles to each other, is illustrated in FIG. 2 of the drawings. It will be noted in referring to FIG. 2 of the drawings that the arcuate notches 62 which are formed at each corner of the rectangular central sections 60 compliment each other so that the leaf elements 64 converge at the center section 60, and that radiusing or rounding occurs at this location of intersection such that sharp corner angulation is avoided, and impalement or hanging up of hooks and fishing tackle is substantially reduced. This is to say that by reason of the large radiusing developed between the leaf elements 14 where these elements overlap and intersect adjacent the trunk assembly 12, fowling of fishing tackle used to fish adjacent the artificial structure is obviated, or at least is substantially reduced. It is also important to note that the indented corners of the central section areas 60 are spaced a substantial distance from the tubular trunk section 44 upon which the leaf frond assemblies 14 are mounted, so that hooks and the tackle are kept away from the trunk section 12, as such tackle is lowered through the artificial structure during fishing.

In the illustrated embodiment of the invention, each of the tubular trunk sections 44 has three of the grooves or indentations 46 spaced therealong at about fourteen inches from each other. Thus, in addition to assembling the two or more leaf frond assemblies 14 in engagement with one of the indentations 46 in the manner described, the process of sliding additional leaf frond assemblies 14 axially along the tubular trunk sections 44 until engagement is established with another of the indentations 46 is repeated, so that two or more of the leaf frond assemblies engage the next indentation. After these leaf frond assemblies 14 are in engagement with the indentation 46, the frond assemblies are rotated until they are staggered or offset with respect to the two leaf frond assemblies carried in the first of the indentations 46, and spaced therebelow. Preferrably the orientation of the leaf frond assemblies with respect to those in the next adjacent indentation is such that the leaf elements are staggered or offset by 45° in relation to the leaf elements making up the leaf frond assemblies 14 spaced therefrom along the axis of the tubular trunk section. To one viewing the assembly at this point from above, it would appear that there are a total of eight leaves arranged in circumferentially spaced relationship to each other around the axis of the tubular trunk element 44, with each of these eight leaf elements being spaced from the next adjacent leaf element by 45°.

The process of attaching the leaf frond assemblies 14 to the tubular trunk assembly 12 is then repeated one more time for the first of the two tubular sections 44, so that the last of the three indentations 46 which is adjacent the free upper end thereof is occupied by further leaf frond assemblies 14 which are secured thereto, and in frictional engagement with the respective indentation. In this instance, the leaf elements 64 of the pair of leaf frond assemblies 14 secured to this indentation 46 are oriented so that they are in alignment with the leaf elements 64 making up the first two leaf frond assemblies 14 which were attached to the tubular trunk element 44, that is, the two leaf frond assemblies disposed at the lower end of the tubular trunk section 44.

After the leaf frond assemblies 14 have been placed on the first trunk section 44 in the manner described, the second or uppermost of the two trunk sections 44 is fitted out with sets of leaf frond assemblies 14 in a fashion similar to that which has been described. The described procedure is repeated until one or more of the indentations 46 which are formed around, and extend into, the upper of the two tubular trunk sections 44 have been fitted with a pair of leaf frond assemblies. It should be pointed out that additional leaf frond assemblies can be added at any of the indentations 46, so that more assemblies than only the two assemblies arrayed in a cruciform configuration are utilized. Thus, it may be desirable in some instances, for example, to utilize three of the leaf frond assemblies 14, with the leaf elements 64 arranged at angles of 60° with respect to each other, rather than in the cruciform configuration in which each of the leaf frond assemblies 14 engaged with each of the indentations 46 is extended normal to the other leaf frond assembly in that pair of such assemblies.

After the tubular trunk sections 44 have been adorned with leaf frond assemblies in the manner described, the several trunk sections are telescopingly engaged so that they are axially aligned in a rigid trunk configuration, as depicted in FIG. 1. In telescopingly engaging the tubular trunk sections 44, the protuberant end portion 48 of one of the trunk sections is frictionally pressed into the open end of an adjacent, axially aligned trunk section. The way this socketing telescoping engagement appears is shown in FIG. 5. When the several trunk sections 44 are interengaged in this fashion, they can be interlocked by means of screws 56, or other fastening devices, passed through aligned apertures in the trunk sections in the manner hereinbefore described.

As previously pointed out, the bottom wall or closure plate 52 which extends across and closes the end of the protuberant male portion 48 of each tubular trunk section 44 enables some type of device or substance to be placed in each or all of the interengaged tubular trunk sections to provide additional functions to the artificial structure of the invention. Thus, where the trunk sections are made of a clear, light transmissive or translucent plastic material, a small light producing device, such as a pen light or a flash light, may be rested upon the closure plate 52 after the light has been turned on, and, when the artificial fish attracting structure is assembled, this light will shine through the translucent plastic and act as a source of attraction for fish during night fishing. Alternatively, some type of water soluble food material which will attract fish because of either its color or its aroma can be placed in the closed protuberant portion 48. In this case, it may be desirable to place additional holes or apertures 50 through the protuberant section 48 and the surrounding tubular trunk section 44 so that water can pass into the trunk section and thoroughly saturate the material which is placed in the closed protuberant portion. The odor or color derived from this material can then be wafted out through the apertures formed through the telescopingly engaged portions of the tubular sections.

It will be apparent that as many of the tubular trunk sections 44 as may be desirable can be interengaged in a telescoped, axially aligned status. In most instances, the number of sections used will depend upon the depth of the water in which the structure is located, but the selected overall length of the several tubular sections which are inter-engaged can also be determined in part by the naturally occurring structure, such as natural trees, limbs, rocks or the like which may be disposed in close proximity to the location where the artificial structure is to be placed.

In order to adequately anchor or secure the artificial structure at the desired location, the ballast assembly 10 is provided. The ballast assembly 10 is initially filled with a weighting material of some type such as stones or rocks 41 as illustrated in the drawings. These function to give sufficient mass to the ballast assembly 10 to cause it to sink in the water and to cause the container formed by the joined upper wall portion 20 and lower wall portion 22 to be firmly held against the bottom of the lake or other body of fresh water. As has been previously pointed out, in preparing to locate the artificial structure in the water where it is to be used to function in attracting fish, it may also be desirable to place dough balls 42 or some other type of food substance or fish attractive material within the hemispherical container 16.

After the container has received the rocks or other ballast 41 and food material 42, the free ends of the strap 18 are secured to the protuberant lower end portion 48 of the tubular trunk section 44, using the pins 52 hereinbefore described. The pins 52 further to pivotally or swivelly secure the container 16 to the lower end of the trunk of the artificial structure, and this in turns plays an important role in allowing the structure of the invention to be securely located even on a sloping bottom. Thus, even though the container 16 may be canted or slanted or tilted slightly by the reason of resting upon an uneven bottom, the trunk assembly 12, constructed as it is of buoyant material, and the leaf frond assemblies 14, also constructed of a buoyant material, can float free so as to project in a generally vertical direction from the ballast assembly 10.

The arrangement of the several substructures of the artificial structure of the invention is such that a device offering a very substantial attraction to game fish is provided in an easily portable form. The artificial structure can be set up at any desired location in the water, and will remain stable at that location over an indefinite period of time. The synthetic resins of which the entire structure is preferably constructed are durable and characterized in having a long service life—in fact, the artificial structure of the invention will function effectively over a much longer period of time than the period of time that natural shrubbery, natural trees or the like will last after being submerged in the water.

Although a preferred embodiment of the invention has been herein described in order to provide an example of the principles used in constructing the structure of the invention, it will be understood that various changes and innovations can be made without departure from these basic principles. All such changes and innovations are therefore deemed to be circumscribed by the spirit and scope of the invention, except as the same may be necessarily limited by the appended claims or reasonable equivalents thereof.

What is claimed is:

1. An artificial structure for attracting fish comprising:
   a ballast assembly for anchoring the structure at a selected location on the bottom of a body of water;
   an elongated trunk assembly constructed of a buoyant material and freely pivotally connected to the ballast assembly for pivotation about a horizontal axis as said trunk assembly undergoes movement due to motion of the water, and extending generally upwardly therefrom; and a plurality of leaf frond subassemblies detachably engaged with the trunk assembly, and each selectively rotatable about the longitudinal axis of said trunk assembly without concurrent rotating movement of said trunk assembly whereby the several leaf frond subassemblies can be arranged in circumferentially preselected array about the axis of said elongated trunk assembly.

2. An artificial structure as defined in claim 1 wherein said elongated trunk assembly comprises a plurality of telescoped tubular sections of polygonal cross-sectional configuration whereby said telescoped tubular sections are interengaged and keyed, by reason of their cross-sectional configurations, against rotation relative to each other and about the axis of said elongated trunk assembly, thereby retaining the leaf frond subassemblies engaged therewith against rotation as a result of rotation of said tubular sections relative to each other and with the leaf frond subassemblies engaged therewith.

3. An artificial structure for attracting fish as defined in claim 2 wherein each tubular section of said trunk assembly carries at least one circumferentially extending, radially inwardly projecting indentation, and wherein each of said leaf frond subassemblies includes a central, trunk-engaging section engaging a tubular trunk section at one of said radially inwardly projecting indentations whereby each of the leaf frond subassemblies is rotatable about the longitudinal axis of the trunk assembly but is keyed against axial movement therealong.

4. An artificial structure for attracting fish as defined in claim 2 wherein each of said tubular sections has an open, upper end and a closed lower end thereby facilitating placement and retention of a material within one or more telescoped tubular sections.

5. An artificial structure for attracting fish as defined in claim 4 wherein each tubular section of said trunk assembly carries at least one circumferentially extending, radially inwardly projecting indentation, and wherein each of said leaf frond subassemblies includes a central, trunk-engaging section engaging a tubular trunk section at one of said radially inwardly projecting indentations.

6. An artificial structure for attracting fish as defined in claim 1 wherein each of said leaf frond subassemblies includes a central trunk engaging section; and a pair of leaf elements disposed at opposite sides of said central trunk engaging section, and wherein said leaf elements are longitudinally and transversely bowed for enhancing the structural strength of said leaf elements.

7. An artificial structure for attracting fish as defined in claim 6 wherein each of said leaf elements is generally eliptically-shaped and has a convex upper side and a concave lower side.

8. An artificial structure for attracting fish as defined in claim 6 wherein each of said leaf elements is further characterized as including:

a roughened, textured upper surface facilitating the growth of periphyton thereupon; and a roughened, textured lower surface facilitating the growth of periphyton thereupon.

9. An artificial structure for attracting fish as defined in claim 6 wherein said elongated trunk assembly comprises a plurality of telescoped tubular sections of polygonal cross-sectional configuration.

10. An artificial structure for attracting fish as defined in claim 6 wherein each of said leaf elements has an outer end and has a generally eliptical configuration, and is further characterized in having a pair of opposed, convexly curved outer edges which converge at the outer end of the respective leaf element, each of said leaf elements further including:

a centrally located line of division disposed substantially half way between said convex outer edges and extending from said central trunk-engaging section to said outer end; and a plurality of spaced ribs extending from the opposite sides of said centrally located line of division outwardly toward said convex outer edges of the respective leaf elements.

11. An artificial structure for attracting fish as defined in claim 10 wherein each of said ribs is of increasing transverse width from said centrally located line of division toward the convex outer said edge toward which the respective rib extends.

12. An artificial structure for attracting fish as defined in claim 10 wherein said central trunk-engaging section is substantially rectangular in configuration, and each of said leaf elements is configured as a truncated elipse, and wherein at each of the four corners of said substantially rectangular central section, an arcuate notch forming a concavity in the leaf frond is located and intersects one of said convexly curved outer edges of the adjacent leaf elements.

13. An artificial structure for attracting fish as defined in claim 6 wherein said ballast assembly comprises a pair of generally hemispherical halves including an upper half and a lower half snap engaged with each other to form a hollow container, said upper half having a central opening thereinto, and said ballast assembly further including a pair of spaced legs formed integrally with said lower half and projecting from the lower side thereof.

14. An artificial structure for attracting fish as defined in claim 13 wherein said ballast assembly further includes an elongated, flexible strap extending around a major portion of said hollow container and lying in a plane extending normal to a plane along which said hemispherical halves are joined by snap engagement with each other, said strap pivotally engaging said elongated trunk assembly.

15. An artificial structure for attracting fish as defined in claim 6 wherein said central, trunk-engaging section includes a circular area which is offset out of the plane of the remainder of said central trunk-engaging section, said circular area having a trunk-receiving opening in the center thereof receiving the elongated trunk assembly therethrough.

16. An artificial structure for attracting fish as defined in claim 12 wherein said trunk assembly includes a plurality of detachably interconnected sections each carrying a circumferentially extending, radially inwardly projecting indentation engaging the trunk-engaging section of one of said leaf frond subassemblies by receiving in said indentation the portion of said circular area which surrounds said trunk-receiving opening.

17. An artificial structure for attracting fish as defined in claim 1 wherein said ballast assembly comprises:

an anchoring base container; and an elongated, flexible securing strap pivotally connecting said base container to said elongated trunk assembly.

18. An artificial structure for attracting fish as defined in claim 1 wherein each of said leaf frond subassemblies is constructed of polyethylene.

19. An artificial structure for attracting fish as defined in claim 1 wherein said ballast assembly is further characterized as including a pair of substantially semi-circular supporting feet located at opposite sides thereof.

20. An artificial structure for attracting fish comprising:
- a ballast assembly for weighting the lower end of the structure and positioning the artificial structure at a selected location on the bottom of a body of water;
- an elongated trunk assembly freely pivotally connected to said ballast assembly for pivotation about a horizontal axis and including a plurality of axially aligned, detachably engaged elongated tubular sections; and
- a plurality of synthetic resin leaf frond subassemblies detachably engaged with said trunk assembly at axially spaced intervals therealong, each of said leaf frond subassemblies being selectively rotatable about the longitudinal axis of said trunk assembly whereby the several leaf frond subassemblies can be arranged in circumferentially preselected array about the axis of said trunk assembly, each of said leaf frond subassemblies including:
  - a centrally apertured, central trunk engaging section; and
  - a pair of frusto-eliptical leaf elements joined to said central trunk-engaging section on opposite sides thereof and in alignment with each other.

21. An artificial structure for attracting fish as defined in claim 20 wherein each of said leaf elements is further characterized as including a roughened, textured upper surface facilitating the growth of periphyton thereupon.

22. An artificial structure for attracting fish as defined in claim 20 wherein said leaf frond subassemblies can be selectively rotated about the axis of said elongated trunk assembly and can be selectively pre-positioned in an axial position along said trunk assembly, and then retained in said axial positions during use of the artificial structure.

23. An artificial structure for attracting fish comprising:
- an elongated trunk assembly including a plurality of axially aligned, elongated tubular sections detachably and telescopingly engaged in end-to-end serial relation, each of said sections having an open upper end and a closed lower end portion adapted to be slidingly and frictionally inserted in the open upper end of another of said tubular sections, and each of said tubular sections having at least one circumferentially extending, radially inwardly projecting indentation lying in a plane which extends substantially normal to the longitudinal axis of said elongated trunk;
- means for weighting the lower end of the artificial structure connected freely pivotally to the lowermost of said tubular sections; and
- a plurality of spaced, flexible, leaf frond subassemblies located at longitudinally spaced intervals along said elongated trunk assembly, and each including:
  - a central trunk engaging section having a central opening therethrough receiving a tubular section of said trunk assembly and fitting into, and being engaged by, one of said indentations to thereby restrict movement of the leaf frond subassembly in an axial direction relative to said trunk assembly; and
  - a pair of leaf elements joined to opposite sides of said central trunk engaging section and having a generally frusto-eliptical configuration.

24. An artificial structure for attracting fish comprising:
- a ballast assembly for anchoring the structure at a selected location on the bottom of a body of water, said ballast assembly including a flexible strap movably secured thereto and projecting from the upper side of the ballast assembly;
- an elongated trunk assembly including a plurality of telescoping sections and constructed of a buoyant material, said trunk assembly having a lower end freely pivotally connected to said strap for pivotation about a horizontal axis, and connected by said strap to the remainder of said ballast assembly, said trunk assembly extending generally upwardly from said strap and said ballast assembly; and
- a plurality of flexible, buoyant leaf frond subassemblies each detachably engaged with the trunk assembly, with the several leaf frond subassemblies spaced from each other axially along the elongated trunk assembly, and each of said leaf frond subassemblies being selectively, manually, rotatable about the longitudinal axis of said trunk assembly without concurrent rotation of the trunk assembly about its longitudinal axis, each of said leaf frond subassemblies including a central section defining a portion which frictionally engages the trunk assembly to prevent rotation of the respective leaf frond subassembly under the influence of mild water motion, whereby the several leaf frond subassemblies can be arranged in a circumferentially preselected array about the axis of elongated trunk assembly without water displacement from said preselected array.

25. An artificial structure for attracting fish comprising:
- a ballast means for anchoring the structure at a selected location on the bottom of a body of water;
- an elongated trunk assembly constructed of a buoyant material and having a lower end freely pivotally connected to the ballast means and extending generally upwardly therefrom, said elongated trunk assembly including a plurality of telescoped, tubular sections of polygonal cross-sectional configuration keyed against rotation about the axis of the elongated trunk assembly with respect to each other by reason of said polygonal cross-sectional configuration;
- each of said tubular sections carrying at least one circumferentially extending, radially inwardly projecting indentation also of polygonal cross-sectional configuration; and
- a plurality of leaf frond subassemblies detachably engaged with said trunk assembly, and each being selectively manually rotatable about the longitudinal axis of said trunk assembly, each of said leaf frond subassemblies comprising:
  - a central trunk engaging section engaging one of said tubular trunk sections at one of said radially inwardly projecting indentations, and including flexible segments bearing against the sides of said radially, inwardly projecting indentations where said indentations are of polygonal cross-sectional configuration whereby each of said leaf frond subassemblies is frictionally engaged with said respective tubular trunk section against rotation about the longitudinal axis of said elongated trunk assembly; and a pair of leaf elements disposed on opposite sides of said central trunk engaging section, each of said leaf elements being longitudinally and transversely bowed for enhancing the structural strength of said leaf elements.

26. An artifical structure for attracting fish comprising:

a ballast assembly for anchoring the structure at a selected location on the bottom of a body of water;

an elongated trunk assembly constructed of a buoyant material and pivotally connected to the ballast assembly and extending generally upwardly therefrom; and a plurality of leaf frond subassemblies detachably engaged with the trunk assembly, and each selectively rotatable about the longitudinal axis of said trunk assembly whereby the several leaf frond subassemblies can be arranged in circumferentially preselected array about the axis of said elongated trunk assembly; said ballast assembly including:

a hollow container having two generally hemispherical halves joined to each other to form the hollow container, said container having a bottom wall defining apertures formed therethrough to permit water to drain from the interior of the container, and further including an inwardly and downwardly projecting annular flange defining an opening adjacent the top of said container to facilitate the lifting of said container; and an elongated securing strap extended around said container and projecting upwardly from opposite sides thereof, said securing strap being secured to the lower end of said elongated trunk assembly and said strap including leg portions and a central bight portion located between said leg portions.

27. An artificial structure for attracting fish as defined in claim 26 wherein said elongated trunk assembly comprises a plurality of telescoped, tubular sections of polygonal cross-sectional configuration.

28. An artificial structure for attracting fish as defined in claim 26 wherein each of said leaf frond subassemblies includes:

a central trunk engaging section; and a pair of leaf elements disposed on opposite sides of said central trunk engaging section, and wherein said leaf elements are longitudinally and transversely bowed to enhance the structure strength of said leaf elements.

29. An artificial structure for attracting fish as defined in claim 26 wherein each of said hemispherical halves includes an indented strap channel for receiving leg portions of said securing strap, and wherein said bottom wall defines a transverse strap-receiving channel for receiving said central bight portion of said securing strap located between said leg portions.

* * * * *